United States Patent [19]

Tsukamoto et al.

[11] Patent Number: 4,904,895
[45] Date of Patent: Feb. 27, 1990

[54] ELECTRON EMISSION DEVICE

[75] Inventors: Takeo Tsukamoto, Atsugi; Mamoru Miyawaki, Tokyo; Tetsuya Kaneko; Akira Suzuki, both of Yokohama; Isamu Shimoda, Zama; Toshihiko Takeda; Masahiko Okunuki, both of Tokyo, all of Japan

[73] Assignee: Canon Kabushiki Kaisha, Tokyo, Japan

[21] Appl. No.: 189,216

[22] Filed: May 2, 1988

[30] Foreign Application Priority Data

May 6, 1987 [JP] Japan .................................. 62-108846
May 6, 1987 [JP] Japan .................................. 62-108847

[51] Int. Cl.⁴ ............................................. H01J 1/02
[52] U.S. Cl. ...................................... 313/336; 313/351
[58] Field of Search ............... 313/336, 351, 309, 310, 313/243, 291, 306

[56] References Cited

U.S. PATENT DOCUMENTS

| 3,359,488 | 12/1967 | Bashara et al. | 313/326 |
| 3,812,559 | 5/1974 | Spindt | 29/25.18 |
| 4,008,412 | 2/1977 | Yuito et al. | 313/336 X |
| 4,728,851 | 3/1988 | Lambe | 313/336 X |

FOREIGN PATENT DOCUMENTS 1498232 1/1978 United Kingdom .
2195046 3/1988 United Kingdom .

Primary Examiner—Donald J. Yusko
Assistant Examiner—Sandra L. O'Shea
Attorney, Agent, or Firm—Fitzpatrick, Cella, Harper & Scinto

[57] ABSTRACT

An electron emission device comprises an electron emission electrode with a pointed end and a counter electrode positioned opposite to the pointed end, both formed by fine working of a conductive layer laminated on an insulating substrate.

8 Claims, 6 Drawing Sheets

ELECTRON EMISSION DEVICE

BACKGROUND OF THE INVENTION

1. Field of the Invention

The present invention relates to an electron emission device, and more particularly to such a device having an electron emission electrode with a pointed end and an electrode positioned opposite to said pointed end.

2. Related Background Art

As an electron source there has been utilized thermal electron emission from a thermal cathode. Such an electron emission utilizing thermal cathode has been associated with the drawbacks of a large energy loss in heating, necessity of heating means, a considerable time required for preparatory heating, and the tendency of instability of the system caused by heat.

For these reasons there have been developed electron emission devices not relying on heating, among which there is known an electron emission device of field effect (FE) type.

FIG. 1 is a schematic view of a conventional electron emission device of field effect type.

As shown in FIG. 1, the conventional electron emission device of field effect type is composed of a cathode chip 20 formed on a substrate 23 and having a sharply pointed end for obtaining a strong electric field, and an attracting electrode 22 formed on the substrate 23 across an insulating layer 21 and having an approximately circular aperture around the pointed end of the cathode chip 20, wherein a voltage is applied across said cathode chip 20 and said attracting electrode 22 with the positive side at the latter, thereby causing electron emission from the pointed end of the cathode chip 20 where the intensity of electric field is larger.

However, in such a conventional field effect electron emission device, the sharp pointed end of the cathode chip 20 is difficult to make, and has been generally manufactured by electrolytic polishing followed by remolding. This process is however cumbersome, requiring many working steps, and is difficult to automate as it involves various empirical factors. Consequently the manufacturing conditions fluctuate easily, and the product quality cannot be made constant. Also the laminate structure tends to result in a registration error between the cathode chip 20 and the attracting electrode 22.

SUMMARY OF THE INVENTION

In consideration of the foregoing, the object of the present invention is to provide a field effect electron emission device capable of simplifying the manufacturing process of a pointed end of the electron emitting cathode, and being formed as a thin structure.

The above-mentioned object can be achieved, according to an embodiment of the present invention, by an electron emission device having an electron emission electrode with a pointed end and a counter electrode positioned opposite to said pointed end, both formed by fine working of a conductive layer laminated on an insulating substrate.

The intensity of electric field generally required for electron emission is $10^8$ V/cm or higher, and, in the presence of such electric field, the electrons in the solid substance pass through a potential barrier at the surface by tunnel effect, thus causing electron emission.

When a voltage E is applied between the electron emission electrode and the counter electrode, and the radius r of curvature of an electron emitting portion of the electron emission electrode is small, the intensity of electric field E at said electron emitting portion satisfies a relation:

$$E \propto \frac{V}{r}$$

In the electron emission, the range of energy of emitted electrons should preferably be made small in order to improve the convergence of the electrons, and the device is preferably drivable with a low voltage. For these reasons said radius r of curvature should preferably be made as small as possible.

Also in order to stabilize the electron emission voltage, it is desirable to precisely control the distance between the electron emission electrode and the counter electrode.

The present embodiment is to minimize the radius of curvature of the electron emission electrode and to precisely control the distance between said electron emission electrode and the counter electrode, utilizing fine working technology.

In another embodiment of the present invention, the above-mentioned object can be achieved by an electron emission device provided with an electron emission electrode having a pointed end on an insulating substrate in such a manner as to be substantially parallel to said substrate, and an attracting electrode positioned opposite to said pointed end and having an electron emission aperture.

In the present embodiment, an electron emission electrode having a pointed end and an attracting electrode positioned opposite to said pointed end and having an electron emission aperture are formed substantially parallel to the surface of an insulating substrate, and a voltage is applied across said electron emission electrode and said attracting electrode, with the positive side at the latter, to cause electron emission from said pointed end through said electron emission aperture substantially parallel to the surface of said insulating substrate.

DETAILED DESCRIPTION OF THE PREFERRED EMBODIMENTS

Now the present invention will be clarified in detail by embodiments thereof shown in the attached drawings.

Figure 1:
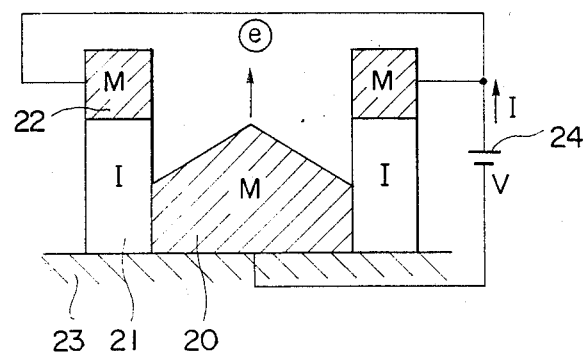
FIG. 1 is a schematic view of a conventional field effect electron emission device.
Figure 2:
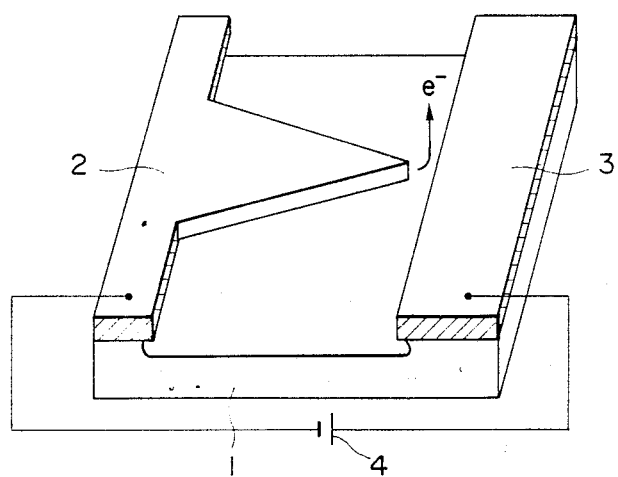
FIG. 2 is a schematic view of a first embodiment of the electron emission device of the present invention.

FIG. 2 is a schematic view of a first embodiment of the electron emission device of the present invention.

As shown in FIG. 2, a conductive layer of a thickness of ca. 500 Å is deposited for example by vacuum evaporation on an insulating substrate 1 such as glass, and an electron emission electrode 2 and a counter electrode 3 are formed by maskless etching technology such as FIB to be explained later.

The pointed end of the electron emission electrode 2 is formed as a triangular or parabolic shape to minimize the radius of curvature, and finished as a wedge-shaped or parabolic-shaped pillar.

The electron emission electrode 2 is preferably formed with a material of a high melting point, since it is formed to minimize the radius of curvature as explained above and generates a large amount of heat because of a high current density, and is also preferably formed with a material of a low work function in order to reduce the applied voltage. Examples of such material include metals such as W, Zr or Ti, metal carbides such as TiC, ZrC or HfC, metal borides such as $LaB_4$, $SmB_4$ or $GdB_4$, and metal silicides such as $WSi_2$, $TiSi_2$, $ZrSi_2$ or $GdSi_2$.

The counter electrode 3 is not limited in form, but, if formed linearly opposite to the pointed end of the electron emission electrode as in the present embodiment, it can be manufactured easily and can cause efficient electron emission from the electron emission electrode 2.

In the electron emission device of the above-explained structure, a voltage is applied, by means of a power source 4, across the electron emission electrode 2 and the counter electrode 3, with the positive side at the latter. Thus a strong electric field is applied to the pointed end of the electron emission electrode 2 to induce electron emission. The emission current density J in such state is given by the equation of Fauler-Nordheim as follows:

$$J_E = 1.54 \times 10^{-6} \frac{E^2}{\phi} \exp\left(-6.83 \times 10^7 \frac{\phi^{3/2}}{E}\right) A/cm^2$$

wherein E is electric field and $\phi$ is work function.

For example, if the pointed end of the electron emission electrode 2 is formed as a parabolic formed blade with a head angle of 30° and distanced from the counter electrode 3 by 0.1 μm with a voltage of 80 V therebetween, there is obtained an electric field of $2.0 \times 10^7$ V/cm, with an emission current of $3.7 \times 10^{-2} A/cm^2$ for a work function of metal of 3.5.

The electrons emitted from the pointed end of the electron emission electrode 2 are partly absorbed by the counter electrode 3, but those with lower energy are diffracted, by low energy electron beam diffraction, by the crystal lattice of the counter electrode 3 and are emitted in a direction perpendicular to the insulating substrate 1. Such electrons having a component of motion in the direction perpendicular to the insulating substrate 1 can be utilized as the electron source.

In order to intensify the electric field between the electron emission electrode 2 and the counter electrode 3 and to efficiently obtain the electrons without electron charging on the insulating substrate, it is desirable to form a deep recess on the substrate where the electric field is concentrated, for example by dry etching. The manufacturing process of such recess will be explained in the following.

FIGS. 3(A)–3(D) are schematic views showing the process for forming a recess on the substrate.

Figure 3A:
FIGS. 3(A) to 3(D) are schematic views showing a process for forming a recess on a substrate.

At first, as shown in FIG. 3(A), a $SiO_2$ layer 6 is formed on a silicon substrate 5 for example by thermal oxidation.

Figure 3B:
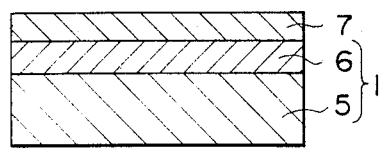

Then as shown in FIG. 3(B), there is formed a conductive layer 7 composed for example of tungsten (W).

Figure 3C:
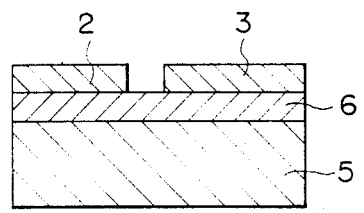

Then as shown in FIG. 3(C), there are formed an electron emission electrode 2 having a pointed end and a linear counter electrode 3 by means of fine working technology such as FIB.

Figure 3D:
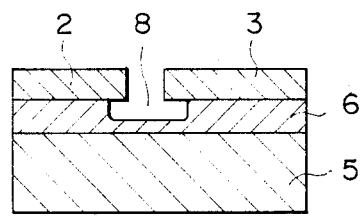

Finally, as shown in FIG. 3(D), the $SiO_2$ layer 6 is selectively etched such as wet etching utilizing fluoric-nitric etching liquid or plasma etching utilizing reaction gas such as $CF_4$. The etching is conducted through the gas between the electron emission electrode 2 and the counter electrode 3 and proceeds isotropically to form a recess 8, whereby the $SiO_2$ layer 6 in a part of the concentrated electric field contributing to the electron emission is completely removed.

In the following there will be explained the fine working technology to be employed in the present embodiment.

Fine working is ordinarily conducted by a photolithographic technology involving a photoresist process and an etching process, but a precision below 0.7 μm is difficult to achieve due to mask aberration etc.

The fine working technology to be employed in the present embodiment should be capable of fine working below 0.7 μm for enabling the use of low voltage, and can be FIB mentioned above.

Figure 4:
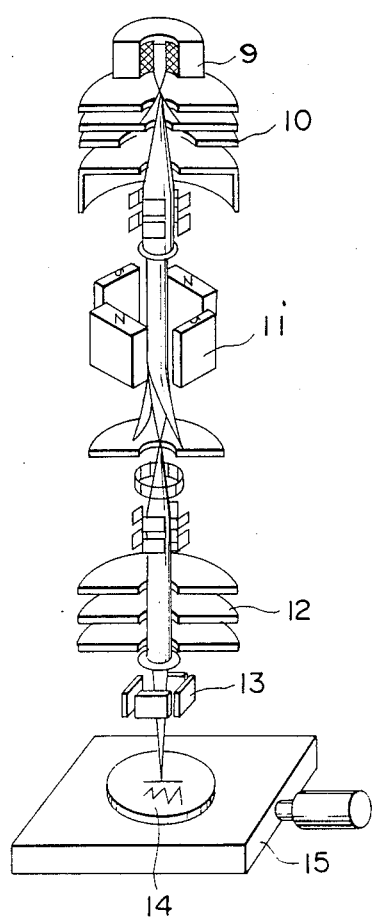
FIG. 4 is a schematic view of an example of an FIB apparatus.

FIG. 4 shows an example of FIB apparatus. The FIB technology utilizes scanning with a metal ion beam concentrated to submicron size to achieve fine working of submicron order, utilizing the sputtering phenomenon on a solid surface.

In FIG. 4, atoms of a liquid metal are emitted from an ion source 9 with an attracting electrode, and a desired ion beam is selected by an EXB mass selector 11 (in case of liquid alloy). Then the ion beam accelerated for example of 80 keV is concentrated by an objective lens 12 to a size of about 0.1 μm, and scans a substrate 14 by means of deflecting electrodes 13. The registration of the ion beam is achieved by a specimen stage 15.

Figure 5:
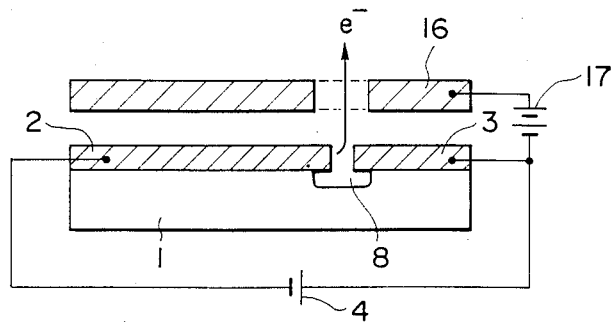
FIG. 5 is a schematic cross-sectional view of a second embodiment of the electron emission device of the present invention.

FIG. 5 is a schematic cross-sectional view of a second embodiment of the electron emission device of the present invention.

The electron emission device of the present embodiment has an electron source of the same structure as in the foregoing embodiment, and, for effectively extracting electrons having different vectors of motion, an attracting electrode 16 positioned above the electron source. When a power source 17 applies a voltage across the electron emission electrode 2 and the attracting electrode 16 with the positive side at the latter, the electrons emitted from the electron emission electrode 2 can be efficiently obtained in a direction perpendicular to the insulating substrate 1.

Figure 6:
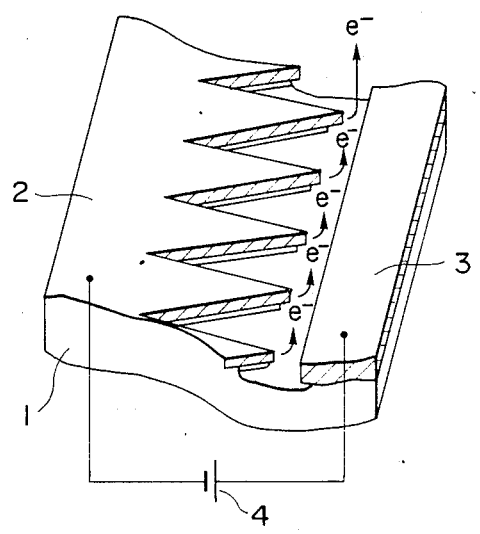
FIG. 6 is a schematic view of a third embodiment of the electron emission device of the present invention.

FIG. 6 is a schematic view of a third embodiment of the electron emission device of the present invention.

The electron emission electrode 2 is provided with plural pointed ends with precisely controlled distance to the counter electrode 3, by means of a fine working technology such as FIB, so that the voltages applied for electron emission show only limited fluctuation and the quantities of electrons emitted from different pointed ends become approximately equal.

Figure 7:
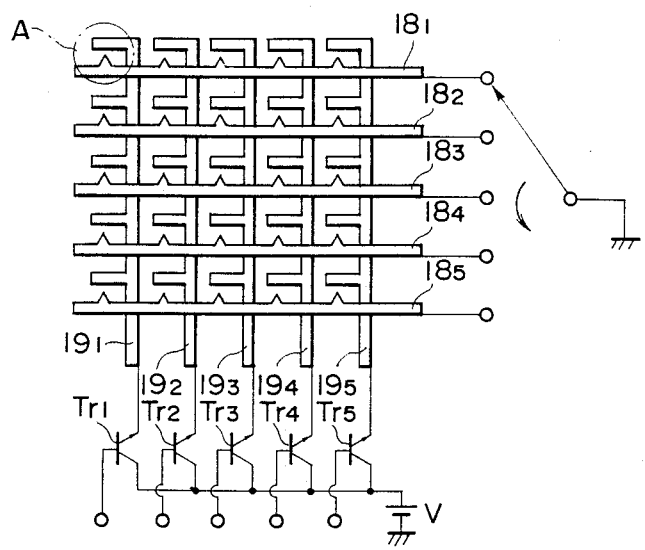
FIG. 7 is a schematic view of a fourth embodiment of the electron emission device of the present invention.

FIG. 7 is a schematic view of a fourth embodiment of the electron emission device of the present invention.

In the electron emission device of the present embodiment, plural electron emitting units A are formed by wirings $18_1$–$18_5$ each having plural pointed ends, and by wirings $19_1$–$19_5$ positioned as a matrix arrangement with respect to said wirings $18_1$–$18_5$ and having counter electrodes respectively corresponding to the pointed ends. The wirings $18_1$–$18_5$ are given a potential of 0 V in succession, and a predetermined voltage V is given to transistors Tr1–Tr5 respectively connected to the wirings $19_1$–$19_5$ in synchronization with successive selection of the wirings $18_1$–$18_5$ to emit electrons from desired electron emitting units.

As detailedly explained in the foregoing, the first to fourth embodiments allow to minimize the radius of curvature of the electron emission electrode and to precisely control the distance thereof from the counter electrode by means of a fine working technology, thereby providing following advantages of:

(1) low voltage drive with reduced fluctuation in the energy of emitted electrons;

(2) a simplified manufacturing process, since a fine working technology such as FIB allows to form the electron emission electrode and the counter electrode with a high precision, without additional steps for example of remolding; and (3) a thinner, smaller and lighter structure since the electron emission electrode and the counter electrode can be precisely formed in a planar structure.

Figure 8:
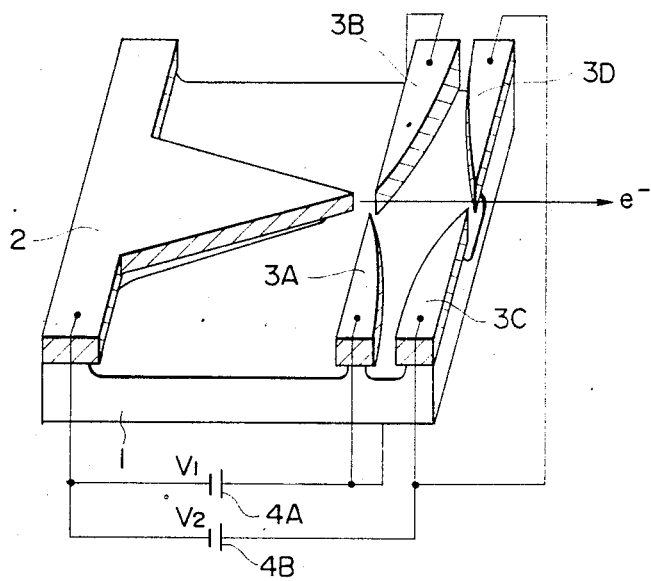
FIG. 8 is a schematic view of a fifth embodiment of the electron emission device of the present invention.

FIG. 8 is a schematic view of a fifth embodiment of the electron emission device of the present invention.

A conductive layer of a thickness of 500–1000 Å is formed by vacuum evaporation on an insulating substrate 1 such as glass, and there are formed, by a maskless etching technology such as FIB explained above, an electron emission electrode 2 and lens constituting members 3A–3D constituting so-called Butler bipotential lens. The lens constituting members 3A, 3B also function as attracting electrodes, which are given a higher potential with respect to the electron emission electrode 2 by means of a power source 4A whereby electrons are emitted from said electrode 2 toward a space between the lens constituting members 3A, 3B.

Said electrons attracted to the space between the lens constituting members 3A, 3B can be converged to a desired focus point, by suitably selecting the ratio of the voltage $V_1$ supplied to the lens constituting members 3A, 3B to the voltage $V_2$ supplied to the lens constituting members 3C, 3D by a power source 4B and the distances between the electron emission electrode 2 and the lens constituting members 3A–3D.

The form and material of the electron emission electrode 2 in the present embodiment can be same as those in the first embodiment.

The lens electrodes are not limited to those of bipotential type explained above but can be of any type having electron converging effect.

In order to intensify the electric field between the electron emission electrode 2 and the lens constituting members 3A, 3B and to efficiently extract the electrons through a gap between the lens constituting members 3C, 3D without electron charging on the insulating substrate, it is desirable to form a recess on the insulating substrate by means for example of dry etching, corresponding at least to the passing area of electrons emitted from the pointed end of the electron emission electrode and/or the area of electric field applied to said electrons. In the present embodiment, as shown in FIG. 8, a recess is formed on the insulating substrate 1, except the areas of the electron emission electrode 2 and the lens constituting members 3A–3D.

FIGS. 9(A)–9(D) are schematic views showing the process of forming said recess on the substrate.

Figure 9A:
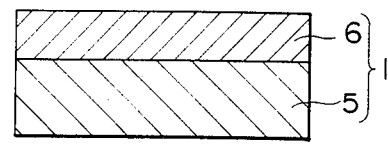
FIGS. 9(A) to 9(D) are schematic views showing the process for forming a recess on a substrate.

At first, as shown in FIG. 9(A), a $SiO_2$ layer 6 is formed on a silicon substrate 5 for example by thermal oxidation.

Figure 9B:
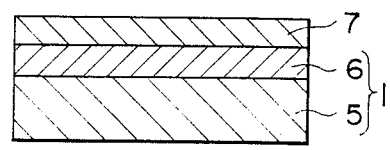

Then, as shown in FIG. 9(B), a conductive layer 7 composed for example of tungsten is formed.

Figure 9C:
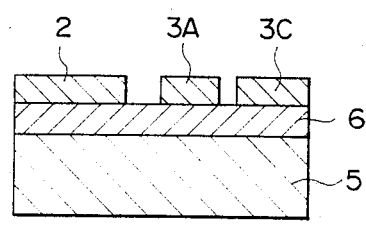

Then, as shown in FIG. 9(C), a fine working process such as FIB is conducted to form the electron emission electrode 2 and the lens constituting members 3A–3D (of which members 3B, 3D are not shown).

Figure 9D:
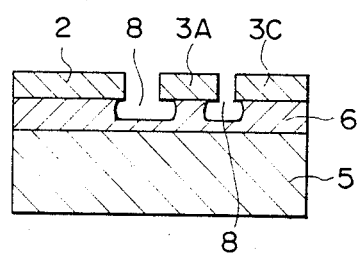

Finally, as shown in FIG. 9(D), the $SiO_2$ layer 6 is selectively etched for example by wet etching utilizing fluoric-nitric etching liquid or by plasma etching utilizing a reactive gas such as $CF_4$. The etching is conducted isotropically on the insulating substrate 1 except portions thereof in contact with the electron emission electrode 2 and the lens constituting members 3A–3D, whereby the surface of the insulating substrate corresponding to the area of electric field is completely removed. The recess 8 is formed in this manner. The structure of the present embodiment can also be formed by the fine working technology utilizing the FIB apparatus shown in FIG. 4.

Figure 10:
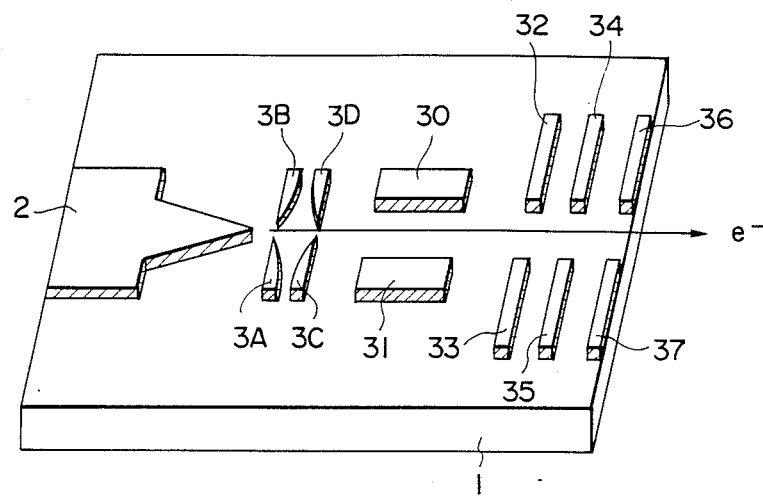
FIG. 10 is a schematic view of a sixth embodiment of the electron emission device of the present invention.

FIG. 10 is a schematic view of a sixth embodiment of the electron emission device of the present invention.

The electron emission device of the present embodiment is provided, in addition to the structure of the device of the above-explained fifth embodiment, with linear electrostatic deflecting plates 30, 31 and Einzel lens members 32–37 on the insulating substrate 1.

Same components as those in said fifth embodiment are represented by same numbers and will not be explained further.

The electron emission device of the present embodiment, being capable of linear deflection and focusing on the insulating substrate 1, can achieve highly precise deflection and focusing, and can form the entire device lighter and thinner.

It is also possible to deflect the electrons two-dimensionally, by forming a device for deflecting in another direction outside the insulating substrate 1.

Plural units of the above-explained electron emission device can be employed to constitute an electron beam image writing apparatus.

Figure 11:
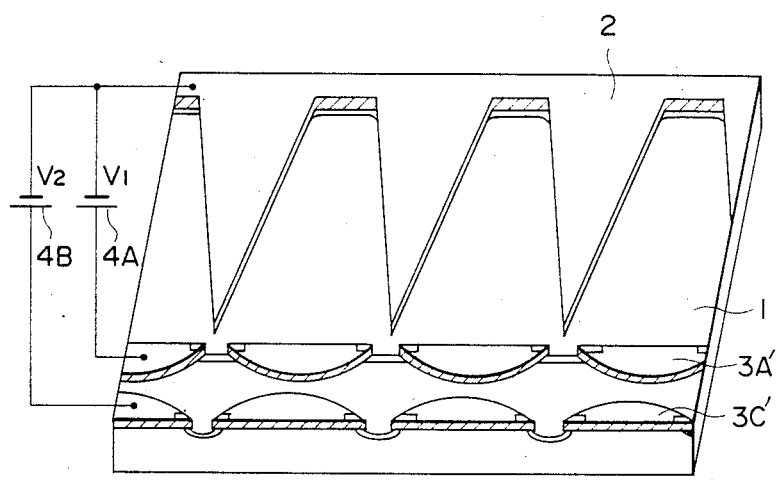
FIG. 11 is a schematic view of a seventh embodiment of the electron emission device of the present invention.

FIG. 11 is a schematic view of a seventh embodiment of the electron emission device of the present invention.

The electron emission device of the present embodiment is provided with plural pointed ends of the type shown in FIG. 5, and corresponding to each pointed end there are provided lens constituting members 3A′, 3C′ constituting a bipotential lens.

In the present embodiment the plural pointed ends and the lens constituting members 3A′, 3C′ can be formed precisely with a fine working technology such as FIB, so that the voltages for electron emission show only small fluctuation and the quantities of electrons emitted from the different pointed ends become substantially equal.

As detailedly explained in the foregoing, the fifth to seventh embodiments have the electron emission electrode and the attracting electrode on a same insulating substrate and is capable of extracting the electrons in a direction substantially parallel to the surface of said substrate, thereby providing following advantages:

(1) The electron emission electrode and the attracting electrode can be prepared in a same step, with a reduced cost and with an improved relative positional precision; and (2) The device can be made thinner, smaller and lighter as the electron emission electrode and the attracting electrode can be formed on a same insulating substrate.

What is claimed is:

1. An electron emission device comprising an electron emission electrode with plural pointed ends and a counter electrode positioned opposite to said pointed ends, both formed by fine working of a conductive layer laminated on an insulating substrate, wherein a matrix structure is formed by wirings each having said plural pointed ends and by wirings having counter electrodes respectively corresponding to said pointed ends.

2. An electron emission device according to claim 1, wherein said counter electrode includes an attracting electrode which is composed of electrode members constituting a lens for converging the emitted electrons.

3. An electron emission device according to claim 2, comprising a recess on said insulating substrate, corresponding to at least one of a passing area of the electrons emitted by the pointed ends of said electron emission element and an area of electric field applied to said electrons.

4. An electron emission device according to claim 2, comprising selected ones of deflecting electrodes and lens electrodes behind said attracting electrode.

5. An electron emission device according to claim 4, comprising a recess on said insulating substrate, corresponding to at least one of a passing area of the electrons emitted by the pointed ends of said electron emission element and an area of electric field applied to said electrons.

6. An electron emission device comprising an electron emission electrode having a pointed end and an attracting electrode positioned opposite to said pointed end and having an electron emission aperture, both formed on an insulating substrate in substantially parallel manner to the surface of said substrate, and further comprising selected ones of deflecting electrodes and lens electrodes behind said attracting electrode.

7. An electron emission device according to claim 6, comprising a recess on said insulating substrate, corresponding to at least one of a passing area of the electrons emitted by the pointed ends of said electron emission element and an area of electric field applied to said electrons.

8. An electron emission device according to claim 6, formed by fine working of a conductive layer laminated on an insulating substrate.

* * * * *